United States Patent
Hwang et al.

(10) Patent No.: US 9,697,702 B2
(45) Date of Patent: Jul. 4, 2017

(54) DISPLAY DEVICE AND METHOD FOR CONTROLLING THE SAME

(71) Applicant: SAMSUNG ELECTRONICS CO., LTD., Suwon-si (KR)

(72) Inventors: Woo-seok Hwang, Seoul (KR); Ji-eun Kim, Suwon-si (KR); Jang-won Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/478,162

(22) Filed: Sep. 5, 2014

(65) Prior Publication Data
US 2015/0061884 A1 Mar. 5, 2015

(30) Foreign Application Priority Data
Sep. 5, 2013 (KR) .................. 10-2013-0106828

(51) Int. Cl.
*G08B 5/00* (2006.01)
*G08B 5/36* (2006.01)
(Continued)

(52) U.S. Cl.
CPC .............. *G08B 5/36* (2013.01); *G09G 3/14* (2013.01); *H04N 5/4403* (2013.01); *H04N 5/64* (2013.01); *H04N 21/4122* (2013.01); *H04N 21/4126* (2013.01); *H04N 21/42222* (2013.01); *H04N 21/42224* (2013.01); *H04N 21/4312* (2013.01); *H04N 21/4782* (2013.01); *H04N 21/4786* (2013.01); *H04N 21/485* (2013.01); *G09G 2354/00* (2013.01)

(58) Field of Classification Search
CPC .... G06F 3/1423; G06F 1/1601; G06F 1/1605; G09G 2310/0232; G09G 3/14; G08B 5/36; H04N 5/64; H04N 5/4403; H04N 21/4126; H04N 21/42222; H04N 21/42224; H04N 21/4312; H04N 21/4782; H04N 21/4786; H04N 21/485; H04N 21/4122
USPC ..... 340/815.4, 815.45, 815.65, 691.2, 691.6, 340/332; 345/173, 204, 690; 348/563
See application file for complete search history.

(56) References Cited

U.S. PATENT DOCUMENTS 8,106,786 B2  1/2012 Kim et al.
2004/0156192 A1* 8/2004 Kerr et al. ............ G06F 1/1601
                                                                   362/154
(Continued)

FOREIGN PATENT DOCUMENTS

KR    10-1065699 B1    9/2011

OTHER PUBLICATIONS

Communication dated Jan. 22, 2015 issued by the European Patent Office in counterpart European Patent Application No. 14183604.9.

*Primary Examiner* — Thomas Mullen
(74) *Attorney, Agent, or Firm* — Sughrue Mion, PLLC

(57) ABSTRACT

A display device is provided, which includes a display configured to display a user interface (UI) screen, a status display which includes a plurality of light emitting elements arranged on an outline region of the display, and a controller configured to control a light emitting status of the plurality of light emitting elements so as to provide a light interaction in which the plurality of light emitting elements operate in a preset display pattern based on an interaction occurring on the UI screen.

18 Claims, 40 Drawing Sheets

(51) Int. Cl.

| | |
|---|---|
| *G09G 3/14* | (2006.01) |
| *H04N 5/64* | (2006.01) |
| *H04N 5/44* | (2011.01) |
| *H04N 21/41* | (2011.01) |
| *H04N 21/422* | (2011.01) |
| *H04N 21/431* | (2011.01) |
| *H04N 21/4782* | (2011.01) |
| *H04N 21/4786* | (2011.01) |
| *H04N 21/485* | (2011.01) |

(56) References Cited

U.S. PATENT DOCUMENTS

| | | | |
|---|---|---|---|
| 2006/0132384 A1* | 6/2006 | Nichols | G06F 3/0489 |
| | | | 345/33 |
| 2011/0018849 A1* | 1/2011 | Lowe et al. | G06F 1/1605 |
| | | | 345/205 |
| 2011/0051019 A1 | 3/2011 | Hardacker et al. | |
| 2011/0141358 A1 | 6/2011 | Hardacker et al. | |

* cited by examiner

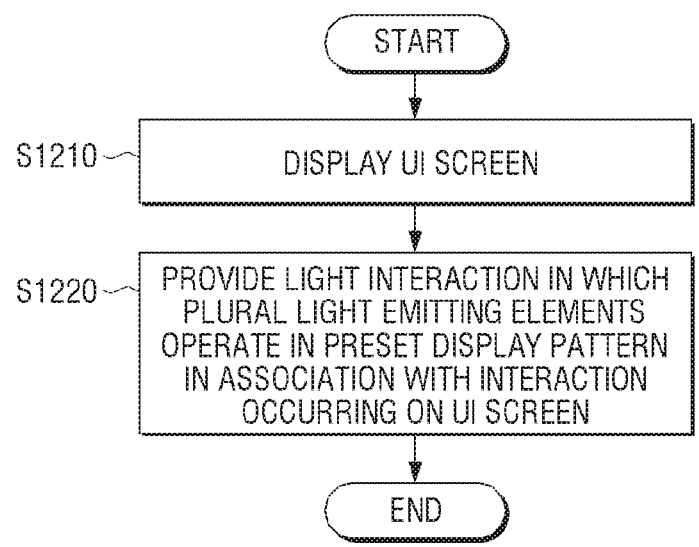

DISPLAY DEVICE AND METHOD FOR CONTROLLING THE SAME

PRIORITY

This application claims priority from Korean Patent Application No. 10-2013-0106828, filed on Sep. 5, 2013, in the Korean Intellectual Property Office, the disclosure of which is incorporated herein by reference.

BACKGROUND

1. Field

Exemplary embodiments relate to a display device and a method for controlling the same. In particular, exemplary embodiments relate to a display device which provides feedback effects on an interaction and a method for controlling the same.

2. Description of the Related Art

In the related art, various types of display devices have been developed and utilized. In particular, related art display devices, such as a TV, a personal computer (PC), a laptop computer, a tablet PC, a mobile phone, and an MP3 player, are used in most homes.

In the related art, in order to meet the requirements of users who desire new and diverse functions, new types of display devices have been developed. As an example, various types of schemes have been proposed to activate an interaction between a user and a display device through feedback effects to perform functions in the display device.

Accordingly, there has been a need for schemes that can provide users with various experiences that go beyond the original functions of a display device while providing intuitive feedback for various interactions occurring in the display device.

SUMMARY

Exemplary embodiments may address at least the above needs and provide at least the advantages described below. Further, an aspect of the exemplary embodiments may provide a display device that provides an interaction in association with a user interface and a method for controlling the same.

According to an aspect of the exemplary embodiments, a display device includes a display configured to display a user interface (UI) screen; a status display which includes a plurality of light emitting elements arranged on an outline region of the display; and a controller configured to control a light emitting status of the plurality of light emitting elements so as to provide a light interaction in which the plurality of light emitting elements operate in a preset display pattern based on an interaction occurring on the UI screen.

The display device according to the aspect of the exemplary embodiments may further include a user interface configured to receive an inputted user command for controlling the UI screen, wherein the controller is further configured to control the light emitting status of the plurality of light emitting elements so as to provide a plurality of feedback for the interaction occurring on the UI screen according to the user command.

The controller may be further configured to control the light emitting status of the plurality of light emitting elements so as to provide a plurality of feedback for the interaction occurring on the UI screen according to a preset event occurring in the display device.

The controller may be further configured to control the light emitting status of the plurality of light emitting elements so that the plurality of light emitting elements operate in a plurality of different display patterns based on the interaction occurring on the UI screen.

The controller may be further configured to control the light emitting status of the plurality of light emitting elements so that at least one light which has a "turn on" status of the plurality of light emitting elements change and move to correspond to a moved position of a preset object based on the interaction occurring on the UI screen.

The controller may be further configured to control the light emitting status of the plurality of light emitting elements so that the plurality of light emitting elements operate in one display pattern of a first display pattern in which the plurality of light emitting elements are sequentially turned on and off and one light which has a "turn on" status changes and moves in one direction and a second display pattern in which the plurality of light emitting elements are sequentially turned on and off and at least two lights which have a "turn on" status change and simultaneously move in different regions from each other based on the interaction occurring on the UI screen.

The status display may further include a beam projector arranged on at least one portion of the outline region of the display.

The controller may be further configured to control an operation of the beam projector so that interaction information, which is based on the interaction with the UI screen, is projected on a preset external region of the display device.

The UI screen may include at least one of a channel control screen, a volume control screen, a booting screen, a content reproduction screen, a loading screen, a mail reception screen, a phone reception screen, a panel movement screen, a home screen, and a screen which includes a progress bar.

According to another aspect of the exemplary embodiments, a method for controlling a display device including a plurality of light emitting elements arranged on an outline region of a user interface (UI) screen includes displaying the UI screen; and providing a light interaction in which the plurality of light emitting elements operate in a preset display pattern based on an interaction occurring on the UI screen.

The method for controlling a display device according to the aspect of the exemplary embodiments may further include receiving an inputted user command for the UI screen, wherein the providing the light interaction controls a light emitting status of the plurality of light emitting elements so as to provide a plurality of feedback for the interaction occurring on the UI screen according to the user command.

The providing the light interaction may control the light emitting status of the plurality of light emitting elements so as to provide a plurality of feedback for the interaction occurring on the UI screen according to a preset event occurring in the display device.

The providing the light interaction may control the light emitting status of the plurality of light emitting elements so that the plurality of light emitting elements operate in a plurality of different display patterns based on the interaction occurring on the UI screen.

The providing the light interaction may control the light emitting status of the plurality of light emitting elements so that at least one light which has a "turn on" status of the plurality of light emitting elements change and move to correspond to a moved position of a preset object based on the interaction occurring on the UI screen.

The providing the light interaction may control the light emitting status of the plurality of light emitting elements so that the plurality of light emitting elements operate in one display pattern of a first display pattern in which the plurality of light emitting elements are sequentially turned on and off and one light which has a "turn on" status changes and moves in one direction and a second display pattern in which the plurality of light emitting elements are sequentially turned on and off and at least two lights which have a "turn on" status change and simultaneously move in different regions from each other based on the interaction occurring on the UI screen.

The method for controlling a status display according to the aspect of the exemplary embodiments may further include projecting interaction information, which is based on the interaction occurring on the UI screen, on a preset external region of the display device using a beam projector.

The UI screen may include at least one of a channel control screen, a volume control screen, a booting screen, a content reproduction screen, a loading screen, a mail reception screen, a phone reception screen, a panel movement screen, a home screen, and a screen which includes a progress bar.

According to another aspect of the exemplary embodiments, a system for controlling a light interaction includes a user interface (UI) screen; a plurality of light emitting elements arranged on an outer edge of the UI screen; and a controller configured to control a light emitting status of the light emitting elements so as to provide the light interaction in which the plurality of light emitting elements operate in a preset chase pattern in response to an interaction occurring on the UI screen.

As described above, according to various exemplary embodiments, interactions, which may be provided on the insufficient internal region of the screen, are provided through the light of the outline region of the screen. Thus, the interaction effects can be maximized. Accordingly, strong feedback effects can be provided to a user.

BRIEF DESCRIPTION OF THE DRAWINGS

The above and other aspects, features and advantages of the exemplary embodiments will be more apparent from the following detailed description when taken in conjunction with the accompanying drawings, in which:

FIG. 12 is a flowchart illustrating a method for controlling a display device according to an exemplary embodiment of the present disclosure.

DETAILED DESCRIPTION OF EMBODIMENTS OF THE PRESENT INVENTION

Hereinafter, preferred embodiments of the exemplary embodiments will be described in detail with reference to the accompanying drawings.

Figure 1:
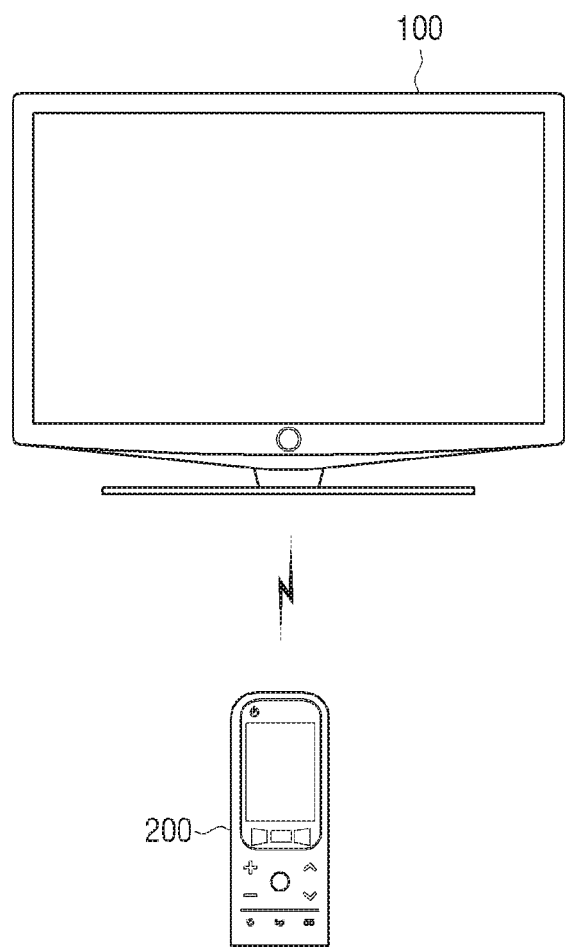
FIG. 1 is a diagram illustrating a display system according to an exemplary embodiment of the present disclosure.

FIG. 1 is a diagram illustrating a display system according to an exemplary embodiment of the present disclosure.

Referring to FIG. 1, a display system according to an exemplary embodiment of the present disclosure includes a display device 100 and a remote controller 200.

As illustrated in FIG. 1, the display device 100 may be implemented by a digital TV, but is not limited thereto. The display device 100 may be implemented by various types of devices having a display function, such as a PC, a mobile phone, a tablet PC, a portable media player (PMP), a personal digital assistant (PDA), and a navigation device. On the other hand, if the display device 100 is implemented by a portable device having a built-in touch screen, programs can be executed using a finger or a pen (e.g., stylus pen). Hereinafter, it is assumed that the display device 100 is implemented by a digital TV.

If the display device 100 is implemented by a digital TV, the display device 100 can be controlled by a user motion, voice, or the remote controller 200. In this case, the remote controller 200 is a device for remotely controlling the display device 100, which may receive an input of a user command and may transmit a control signal that corresponds to the input user command to the display device 100. For example, the remote controller 200 may be implemented in various types in order to sense the motion of the remote controller 200 to transmit a signal that corresponds to the motion, to recognize a voice to transmit a signal that corresponds to the recognized voice, or to transmit a signal that corresponds to an input key. In this case, in order to receive various types of user commands, the remote controller 200 may include a motion sensor, a touch sensor or an Optical Joystick (OJ) sensor using optical technology, a physical button (e.g., tack switch), a display screen, and a microphone.

The display device 100 can provide a varied user interface (UI) screen according to a user command input through the remote controller 200. Further, the display device 100 can provide various functions and information according to various types of user interactions for the UI screen.

In particular, the display device 100 may provide a light interaction in association with various interactions that occur on the UI screen. Hereinafter, various embodiments of the exemplary embodiments will be described with reference to block diagrams illustrating the detailed configuration of the display device 100.

Figure 2A:
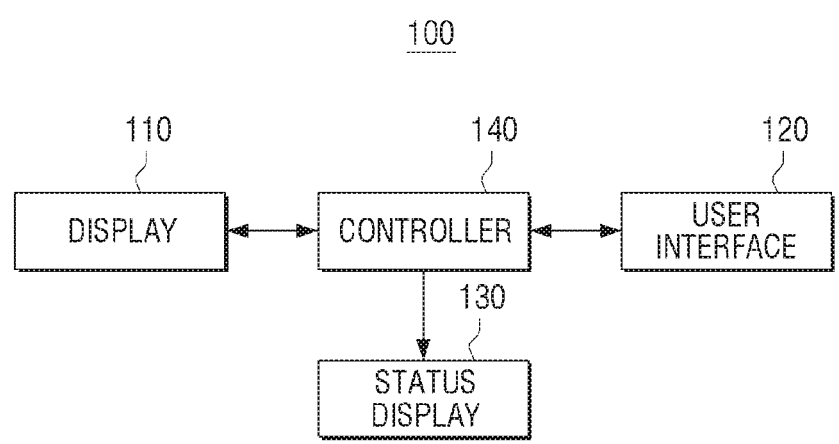
FIGS. 2A and 2B are block diagrams illustrating the configuration of a display device according to an exemplary embodiment of the present disclosure.
Figure 2B:
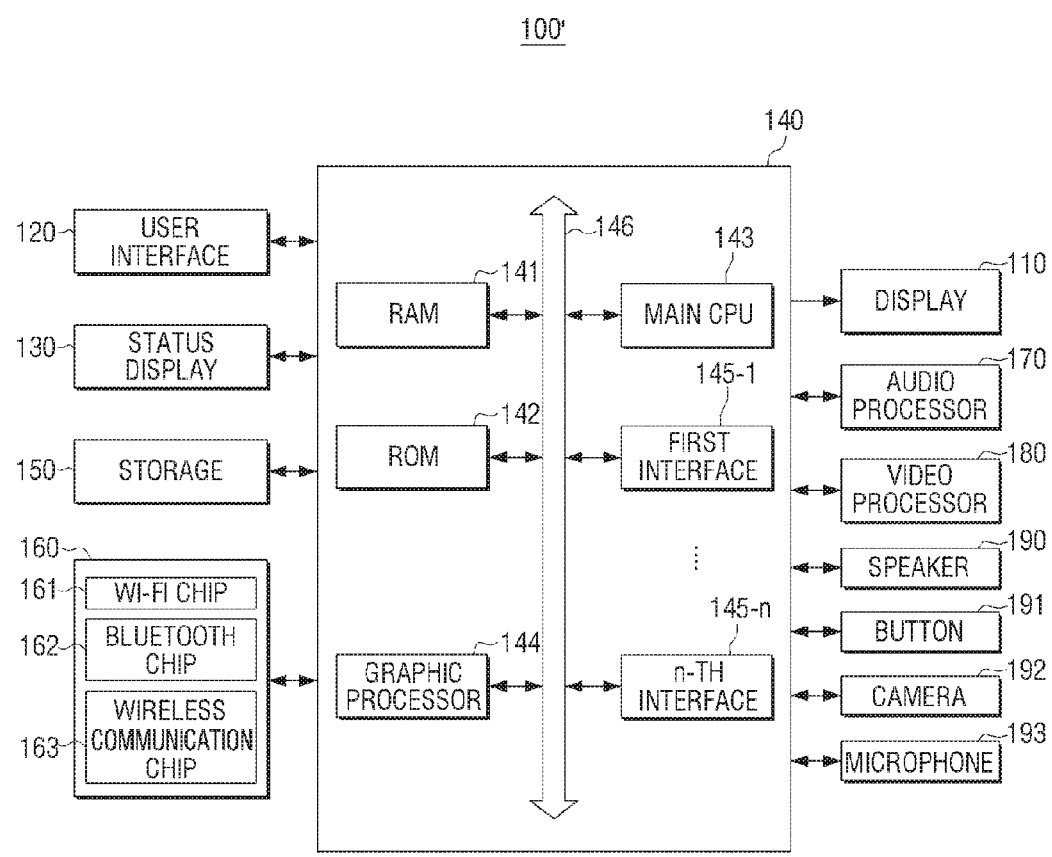

FIGS. 2A and 2B are block diagrams illustrating the configuration of a display device according to an exemplary embodiment of the present disclosure.

Referring to FIG. 2A, the display device 100 includes a display 110, a user interface 120, a status display 130, and a controller 140.

The display 110 displays the UI screen. The UI screen may include various content reproduction screens, such as an image, a moving image, a text, and music, an application execution screen including various pieces of content, a web browser screen, and a graphic user interface (GUI) screen.

In this case, the display 110 may be implemented by a liquid crystal display (LCD) panel or an organic light emitting diode (OLED) panel, but the display 110 is not limited thereto. Further, the display 110 can also be implemented by a flexible display or a transparent display.

In particular, the display 110 displays a UI screen according to a user command. As an example, the display 110 may display a UI screen that indicates a channel control status according to a user command for channel control, and may display a UI screen that indicates a volume control status according to a user command for volume control.

The user interface 120 receives various user commands. The user interface 120 may be implemented in various types according to the display device 100. If the display device 100 is implemented by a digital TV, the user interface 120 may be implemented by a remote control receiver that receives a remote control signal from the remote controller 200, a camera that senses a user motion, and a microphone that receives a user voice. Further, if the display device 100 is implemented by a touch-based portable terminal, the user interface 120 may be implemented in a touch screen type that forms a mutual layer structure with a touch pad. In this case, the user interface 120 may be used with the display 110 as described above.

In particular, the user interface 120 may receive an input of a user command for the UI screen. As an example, the user interface 120 may receive a user command for content reproduction through the UI screen for content control.

The status display 130 may be implemented to include a plurality of light emitting elements arranged on an outline region of the display 110 to display a status in various display patterns under the control of the controller 140. The light emitting element may be, for example, a light emitting diode (LED) that converts electricity into light, but is not limited thereto. Hereinafter, for descriptive convenience, it is assumed that the light emitting element is implemented by an LED.

The plurality of LEDs that constitute the status display 130 may be arranged at preset intervals along the outline region of the display 110, for example, along at least one side portion of a bezel region. That is, the LEDs may be arranged on at least one of an upper bezel region, a lower bezel region, a left bezel region, and a right bezel region. Further, a transparent sheet may be arranged on an LED module so that light of the plurality of LEDs can be continuously expressed without any boundary.

Further, the plurality of LEDs that constitute the status display 130 may be implemented to have the same color or different colors. For example, the plurality of LEDs may have at least one color of white and yellow, but are not limited. Further, it is also possible for the plurality of LEDs to have different colors according to arrangement positions thereof.

According to circumstances, LED pairs having different colors may be adjacently arranged. That is, at least two LEDs may be adjacently arranged in the same position to provide a display pattern having two or more colors. For example, if the plurality of LED pairs arranged in the same position include red LEDs and blue LEDs, only red LEDs or blue LEDs may be used according to the UI screen, or the red LEDs and the blue LEDs may be simultaneously used to represent a pink color display pattern.

On the other hand, the plurality of LEDs that constitute the status display 130 may operate in a preset display pattern in association with an interaction that occurs on the UI screen under the control of the controller 140. As an example, if an interaction that occurs on the UI screen according to a user command for channel control indicates a channel-up state, the plurality of LEDs may operate in a display pattern in which the channel-up state is fed back.

Further, the status display 130 may further include a beam projector which is arranged at least at one portion of the outline region of the display 110.

Figure 5A:
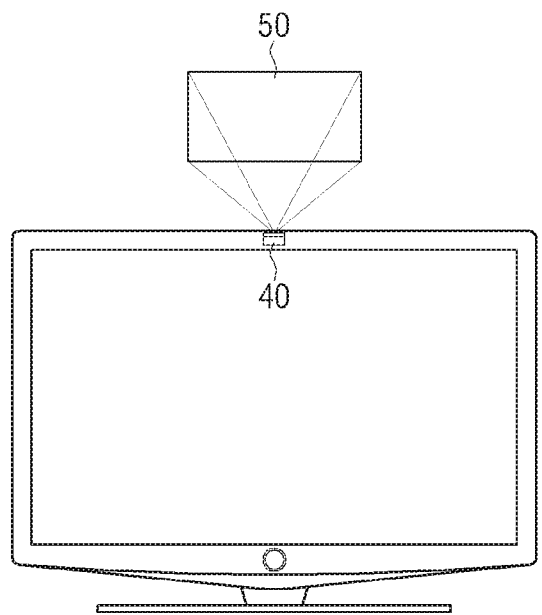
FIGS. 5A to 5C are diagrams illustrating an example of a status display according to another exemplary embodiment of the present disclosure.
Figure 5B:
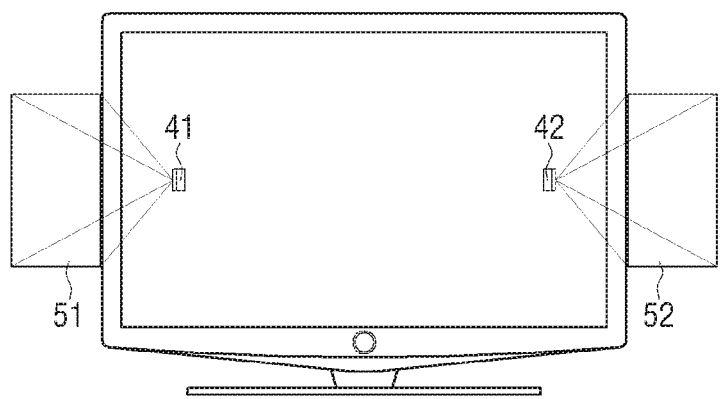
Figure 5C:
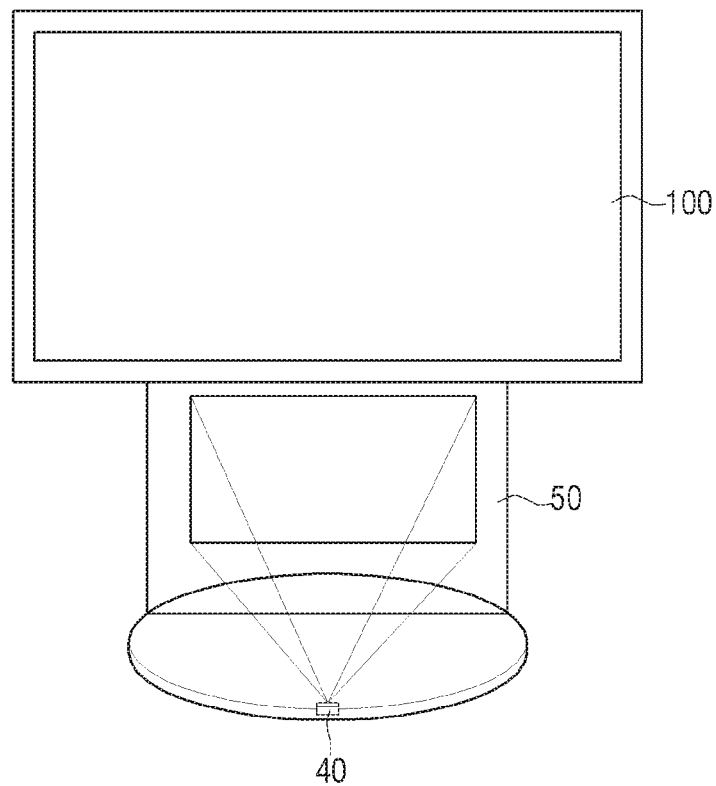

The projector (e.g. as shown in FIGS. 5A-5C) may project light that indicates an image on a predetermined projection region. For example, the projector may be implemented by a small LED projector.

In particular, the projector may be built in the display device 100 or provided on an outside of the display device 100 as a separate device. The display device 100 may project a received image signal on the preset projection region.

In particular, the projector may project an image on an upper wall surface of the rear side and a wall surface of left and right sides of the display device 100, but is not limited thereto. For example, the projector may be implemented to project an image on a stand of the display device 100 and an upper ceiling of the display device 100.

Alternatively, the projector may provide an image including information that corresponds to an interaction occurring on the UI screen under the control of the controller 140. The information may be provided in the form of at least one of graphics and text. As an example, when the screen is being loaded, the projector may project an image including graphics that indicates screen loading on an upper wall surface of the rear side.

Further, the status display 130 may be implemented to include a plurality of projectors that project a plurality of images on different projection regions. As an example, if it is necessary to provide an image including interaction information that occurs on the UI screen on the wall surface of the left and right sides, the projectors may be provided on the left and right sides of the outline region of the display device 100.

The controller 140 controls the whole operation of the display device 100.

In particular, the controller 140 may control the status display 130 to provide a light interaction that corresponds to the interaction occurring on the UI screen.

The interaction that occurs on the UI screen may include status changes of the UI screen, for example, various status changes that may occur on the UI screen, such as a status change of content included in the UI screen, a status change of a menu, and a preset event occurrence. For example, the content status change may include various changes of the number of pieces of content, the size, and the proceeding time point, and the menu status change may include various status changes of volume up/down and channel up/down. Further, the preset event occurrence may include the occurrence of various events, such as mail reception and phone reception.

Alternatively, an interaction that occurs on the UI screen may be at least one of an interaction that occurs according to a user command input through the user interface 120 and an interaction according to an event that occurs in the display device 100. For example, the interaction may be an interaction that is provided on the UI screen according to a user command, such as a user volume control or an interaction according to an event that occurs in the display device, such as mail reception.

Further, the UI screen may be at least one of a channel control screen, a volume control screen, a booting screen, a content reproduction screen, a loading screen, a mail reception screen, a phone reception screen, a panel movement screen, a home screen, and a screen including a progress bar, but is not limited thereto.

The controller 140 may control the light emitting status of the plurality of light emitting elements so that the plurality of light emitting elements that constitute the status display 130 operate in a preset display pattern in association with an interaction that occurs on the UI screen according to a user command. Here, various display patterns in association with interactions may be differently set by default according to product models, or may be implemented to be generated or changed according to a user setting. For example, a user can directly make a display pattern through a menu or can correct the pre-stored display pattern.

The controller 140 may determine the display pattern of the plurality of light emitting elements corresponding to the interaction that occurs on the UI screen, and may control the light emitting status of the plurality of light emitting elements so that the plurality of light emitting elements operate according to the determined display pattern.

In this case, the controller 140 may control the light emitting status of the plurality of light emitting elements so that the plurality of light emitting elements operate in different display patterns according to the different interactions occurring on the UI screen, i.e., so that the plurality of light emitting elements provide different light interactions.

Specifically, the controller 140 may provide a light interaction according to at least one type of a one-point light interaction in which one light moves according to the interaction that occurs on the UI screen, and a multi-point light interaction in which a plurality of lights simultaneously move according to the interaction that occurs on the UI screen.

Here, the one-point light interaction means a light interaction having a display pattern in which the plurality of light emitting elements are sequentially turned on/off in one direction and one light moves, and the multi-point light interaction means a light interaction having a display pattern in which the plurality of light emitting elements are sequentially turned on/off and at least two lights simultaneously move in different regions.

In the case of the one-point light interaction, one light starts to be turned on/off in various positions according to the display pattern. For example, the display pattern may be a pattern in which the light continuously moves from one end to the other end of one of four sides of the screen, or a pattern in which the light continuously moves from the center of one side to the center of another side among four sides of the screen. Further, the one-point light interaction may comprise a chase display pattern, in which one light is sequentially turned on and then off, and when the one light is turned off, the next light in a predetermined direction is turned on and then off, etc. In particular, the preset chase pattern may comprise sequentially turning on and then off at least one of the light emitting elements in a predetermined direction when a previous light emitting element has been turned off.

Other various display patterns will be described later with reference to the drawings.

In the case of the multi-point light interaction, at least two lights start to be turned on/off in various positions according to the display pattern. For example, the display pattern may be a pattern in which the lights continuously move from ends of two opposite sides among four sides of the screen to other ends thereof, or a pattern in which the two lights continuously move from the center of one of the four sides of the screen in different directions. Other various display patterns will be described later with reference to the drawings.

However, according to circumstances, the light interaction may operate in various display patterns, such as a display pattern in which the plurality of light emitting elements are simultaneously turned on, a display pattern in which the plurality of light emitting elements alternately repeat a simultaneous turning on/off, and a display pattern in which displayed colors are changed.

Although the one-point interaction and the multi-point interaction may be implemented in the form in which the light once moves one region as described above, the one-point interaction and the multi-point interaction may also be implemented in the form in which the lights repeat movement or circulation for a preset number of times. For example, in the case of the pattern in which two lights continuously move from the center of one of four sides of the screen in different directions, the light interaction may end after the light moves once, or the corresponding pattern may be repeatedly provided for the preset number of times.

Further, the controller 140 may control the light emitting status of the plurality of light emitting elements so that at least one light that moves according to the turn-on/off status of the plurality of light emitting elements moves corresponding to a preset object in which the position is moved according to the interaction that occurs on the UI screen. Here, the object may conceptually include various types of elements related to interactions, such as icons, graphic elements, and texts. For example, if the position of a progress bar that indicates a reproduction time point is moved according to content reproduction, the controller can control the light emitting status of the plurality of LEDs so that the light moves to correspond to the position of the progress bar.

FIG. 2B is a block diagram illustrating the detailed configuration of a display device 100' according to another exemplary embodiment of the present disclosure. Referring to FIG. 2B, a display device 100' includes a display 110, a user interface 120, a status display 130, a controller 140, a storage 150, a communicator 160, an audio processor 170, a video processor 180, a speaker 190, a button 191, a camera 192, and a microphone 193. In FIG. 2B, detailed explanation of the constituent elements that are duplicate to the constituent elements illustrated in FIG. 1 will be omitted.

The controller 140 controls the operation of the display device 100 using various kinds of programs stored in the storage 150.

Specifically, the controller 140 includes a RAM 141, a ROM 142, a main CPU 143, a graphic processor 144, first to n-th interfaces 145-1 to 145-$n$, and a bus 146.

The RAM 141, the ROM 142, the main CPU 143, the graphic processor 144, and the first to n-th interfaces 145-1 to 145-$n$ may be connected to each other through the bus 146.

The first to n-th interfaces 145-1 to 145-$n$ are connected to the various kinds of constituent elements as described above. One of the interfaces may be a network interface that is connected to an external device through a network.

The main CPU 143 accesses the storage 150, and performs booting using the Operating System (OS) stored in the storage 150. Further, the main CPU 143 performs various operations using various kinds of programs, content, and data stored in the storage 150.

In the ROM 142, a command set for system booting is stored. If a turn-on command is input and the power is supplied, the main CPU 143 copies the OS stored in the storage 150 into the RAM 141 according to the command stored in the ROM 142, and boots the system through execution of the OS. If the booting is completed, the main CPU 143 copies various kinds of application programs stored in the storage 150 into the RAM 141, and performs various kinds of operations through execution of the application program copied into the RAM 141.

The graphic processor 144 generates a screen that includes various objects, such as an icon, an image, and a text, using an operator (not illustrated) and a renderer (not illustrated). The operator (not illustrated) operates attribute values, such as coordinate values, shapes, sizes, and colors of respective objects to be displayed according to the layout of the screen based on a received control command. The renderer (not illustrated) generates a screen of various layouts including the objects based on the attribute values operated by the operator (not illustrated). The screen that is generated by the renderer (not illustrated) is displayed in the display region of the display 110.

Alternatively, the operation of the controller 140 as described above may be performed by a program stored in the storage 150.

The storage 150 stores an Operating System (OS) software module for driving the display device 100, various kinds of multimedia content, various kinds of applications, and various pieces of data, such as various kinds of content that are input or set during execution of the application.

In particular, the storage 150 may store information on various UI screens provided from the display 110 according to an exemplary embodiment of the present disclosure, information on various display patterns provided through the plurality of LEDs according to the interaction that occurs on the UI screen, and information on various interactions provided through the projector beams.

In this case, the controller 140 may control the status display 130 to provide information on the display pattern or the interaction according to the interaction that occurs on the UI screen based on the information stored in the storage 150.

In addition, various software modules stored in the storage 150 will be described with reference to FIG. 3.

Figure 3:
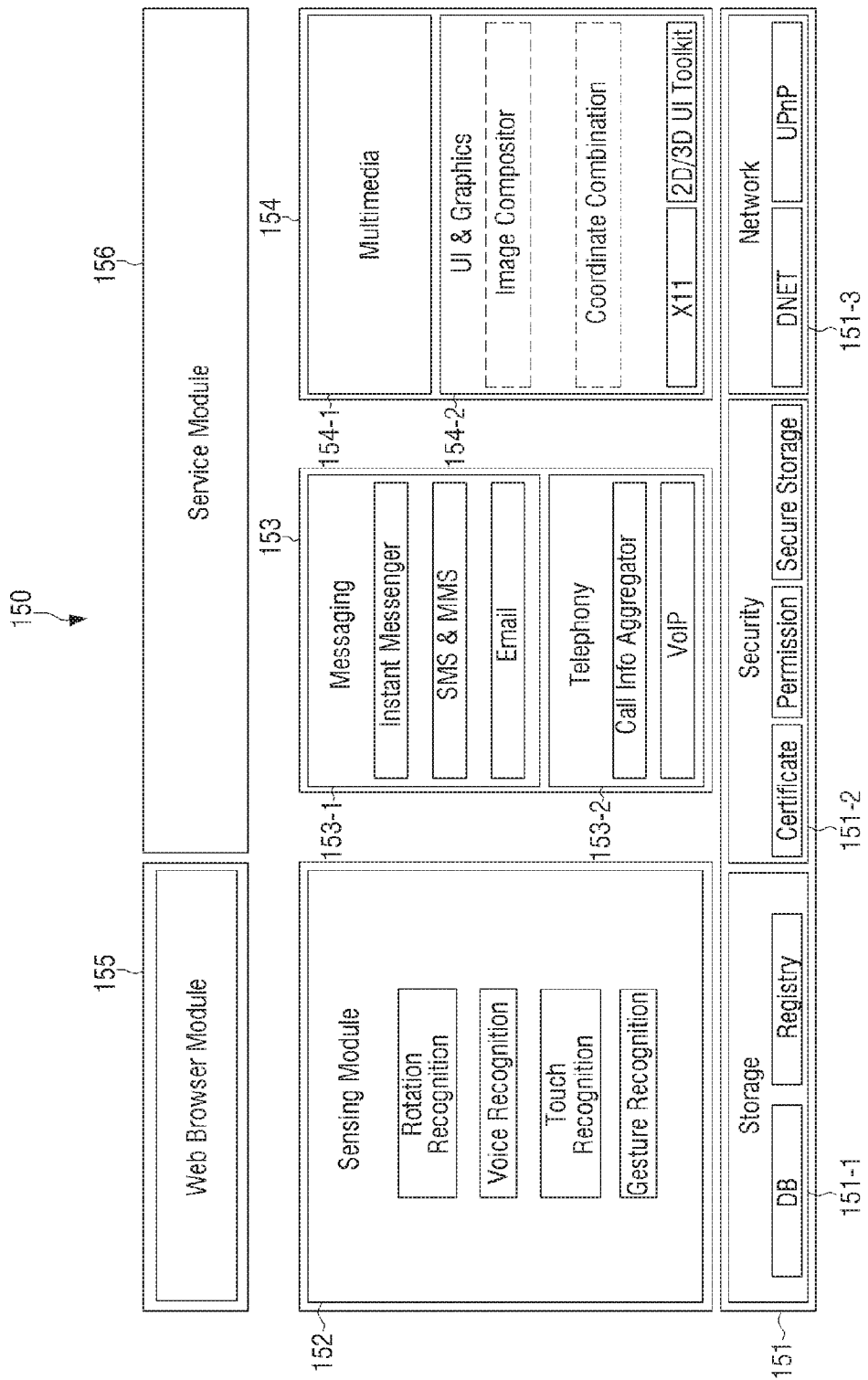
FIG. 3 is a diagram illustrating various software modules stored in a storage according to an exemplary embodiment of the present disclosure.

Referring to FIG. 3, software, which includes a base module 151, a sensing module 152, a communication module 153, a presentation module 154, a web browser module 155, and a service module 156, may be stored in the storage 150.

The base module is a basic module that processes signals transferred from hardware included in the display device 100 and transfers the processed signals to an upper layer module. The base module 151 includes a storage module 151-1, a security module 151-2, and a network module 151-3. The storage module 151-1 is a program module that manages a database (DB) or registries. The main CPU 143 may extract various pieces of data through accessing of the database in the storage 150. The security module 151-2 is a program module that supports hardware certification, request permission, and secure storage, and the network module 151-3 is a module for supporting network connection, and includes a modulo DNET module and an UPnP module for supporting the network connection.

The sensing module 152 is a module that collects information from various kinds of sensors, and analyzes and manages the collected information. The sensing module 152 may include a head direction recognition module, a face recognition module, a voice recognition module, a motion recognition module, and an NFC recognition module.

The communication module 153 is a module for performing external communication. The communication module 153 may include a messaging module 153-1, such as a messenger program, a Short Message Service (SMS) & Multimedia Message Service (MMS) program, an e-mail program, and a phone module 153-2 including a call information aggregator program module and a VoIP module.

The presentation module 154 is a module for configuring a display screen. The presentation module 154 includes a multimedia module 154-1 for reproducing and outputting multimedia content, and a UI rendering module 154-2 for performing UI and graphic processing. The multimedia module 154-1 may include a player module, a camcorder module, and a sound processing module. Accordingly, the multimedia module reproduces various kinds of multimedia content to generate and reproduce the screen and sound. The UI rendering module 154-2 may include an image compositor module combining images, a coordinate combination module combining and generating coordinates on the screen on which an image is to be displayed, an X11 module receiving various kinds of events from hardware, and a 2D/3D UI tool kit providing a tool for configuring a 2D or a 3D type UI.

The web browser module 155 means a module that accesses a web server by performing web browsing. The web browser module 155 may include various modules, such as a web view module configuring a web page, a download agent module performing a download, a bookmark module, and a web kit module.

The service module 156 is a module that includes various kinds of applications to provide various services. Specifically, the service module 156 may include various program modules, such as an SNS program, a content reproduction program, a game program, an e-book program, a mail management program, a phone program, a calendar program, a clock (or alarm) management program, and other widgets.

Although FIG. 3 illustrates various program modules, the illustrated program modules may be partially omitted, modified, or added depending on the kind and characteristics of the display device 100. For example, the program modules may be implemented to further include a position-based module, such as a global positioning chip (GPS) chip, which supports a position-based service in association with the hardware.

The communicator 160 may perform communication with an external device according to various types of communication methods.

The communicator 160 includes various communication chips, such as a Wi-Fi chip 161, a Bluetooth chip 162, and a wireless communication chip 163. The Wi-Fi chip 161 and the Bluetooth chip 162 respectively perform communication in a Wi-Fi method and in a Bluetooth method. The wireless communication chip 163 means a chip that performs communication according to various communication standards, such as IEEE, ZigBee, $3^{rd}$ Generation (3G), $3^{rd}$ Generation Partnership Project (3GPP), and Long Term Evolution (LTE). In addition, the communicator 160 may further include a Near Field Communication (NFC) chip that operates in an NFC method.

The audio processor 170 is a constituent element that processes audio data. The audio processor 170 may perform various processes, such as audio data decoding, amplification, and noise filtering. In particular, according to an exemplary embodiment of the present disclosure, the audio processor 170 may generate and provide feedback sound that corresponds to at least one of a display pattern provided through the plurality of LEDs and interaction information provided through the beams.

The video processor 180 is a constituent element that processes video data. The video processor 180 may perform various image processes, such as video data decoding, scaling, noise filtering, frame rate conversion, and resolution conversion.

The speaker 190 is a constituent element that outputs various kinds of audio data processed by the audio processor 170 and various kinds of an alarm sound or voice messages.

The button 191 may include various types of buttons, such as a mechanical button, a touch pad, and a wheel, which are formed in an arbitrary region, such as a front portion, a side portion, or a rear portion, of a main body of the display device 100. For example, a button for turning on/off the power supply to the display device 100 may be provided.

The camera 192 is a constituent element for capturing a still image or a moving image according to a user control. In particular, the camera 192 may capture images of various kinds of user motions to control the display device 100.

The microphone 193 is a constituent element that receives an input of a user voice or other sound and converts the input voice or sound into audio data. The controller 140 may use the user voice input through the microphone 193 in a call process, or may convert the input user voice into audio data to store the audio data in the storage 150. On the other hand, the camera 192 and the microphone 193 may be constituent elements of the user interface 120 according to the functions thereof.

If the camera 192 and the microphone 193 are provided, the controller 140 may perform control operation according to the user voice input through the microphone 193 or the user motion recognized by the camera 194. That is, the display device 100 may operate in a motion control mode or in a voice control mode. In the motion control mode, the controller 140 captures an image of a user through activation of the camera 192, tracks the change of the user motion, and performs a corresponding control operation. In the voice control mode, the controller 140 analyzes the user voice input through the microphone, and performs a control operation according to the analyzed user voice.

In addition, various external input ports for connecting to various external terminals, such as a headset, a mouse, and a LAN, may be further included.

Although not illustrated in the drawing, the display device 100 may further include a feedback provider (not illustrated). The feedback provider (not illustrated) provides various feedback (e.g., audio feedback, graphic feedback, and haptic feedback) according to interactions occurring on the UI screen. Specifically, the feedback provider (not illustrated) may provide a feedback that corresponds to at least one of the display pattern and the interaction information that are provided through the status display 130. For example, if the light emitting status of the LEDs is controlled according to the position of a movable object included in the UI screen, the graphic feedback may be provided with respect to the corresponding object.

FIG. 2B shows an example of the detailed configuration included in the display device 100. According to an exemplary embodiment, parts of the constituent elements illustrated in FIG. 2B may be omitted or changed, or other constituent elements may be further added. For example, if the display device 100 is implemented by a mobile phone, the display device 100 may further include a global positioning system (GPS) receiver (not illustrated) that receives a GPS signal from a GPS satellite and calculates the current position of the display device 100 and a digital multimedia broadcasting (DMB) receiver (not illustrated) that receives and processes a DMB signal.

Hereinafter, referring to the drawings, various examples related to providing of a display pattern of the status display 130 and interaction information will be described.

Figure 4A:
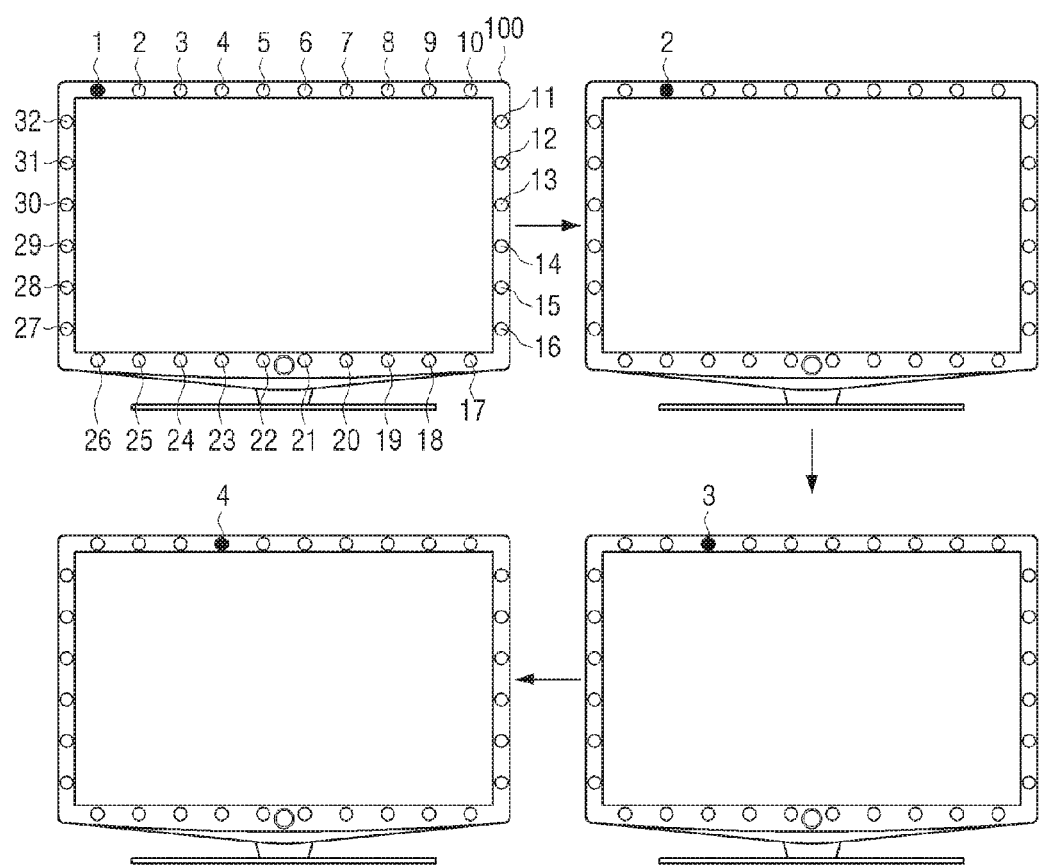
FIGS. 4A and 4B are diagrams illustrating an example of a status display according to an exemplary embodiment of the present disclosure.
Figure 4B:
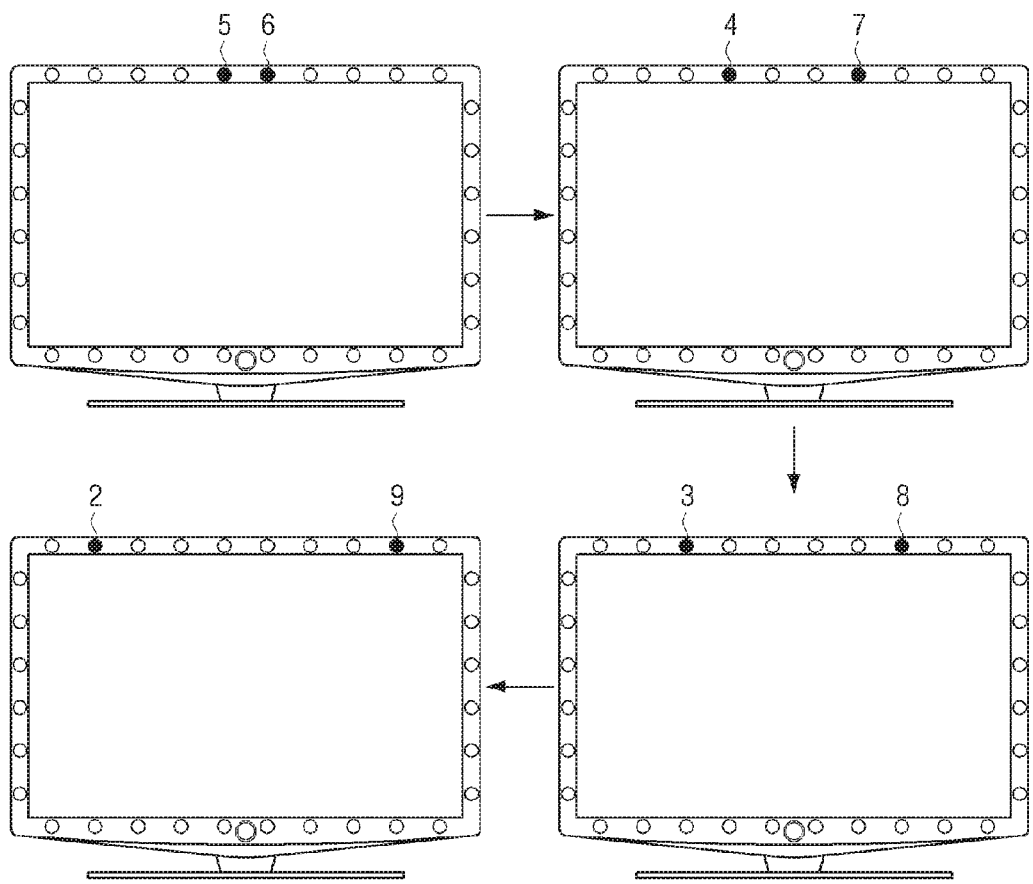

FIGS. 4A and 4B are diagrams illustrating an example of a status display according to an exemplary embodiment of the present disclosure.

As illustrated in FIGS. 4A and 4B, the status display 130 may include a plurality of LEDs arranged on an outline region of the display device 100. In the illustrated example, the plurality of LEDs are arranged to surround the outline region of the screen. According to circumstances, however, the plurality of LEDs may also be arranged on at least one of an upper outline region, a lower outline region, a left outline region, and a right outline region of the screen.

Hereinafter, for descriptive convenience, the turn-on status of the LED is illustrated as "Ø", the turn-off status of the LED is illustrated as "O", the preset number of LEDs is 32, and the respective LEDs are numbered as #1 to #32.

As illustrated in FIG. 4A, according to an exemplary embodiment of the present disclosure, a one-point light interaction may be provided, in which a plurality of LEDs #1 to #32 are sequentially turned on/off in one direction. Thus, one light being turned on sequentially moves in the one direction. FIG. 4A illustrates that the LED #1 that is positioned at a left upper vertex starts to be turned on and the LEDs are sequentially turned on in a clockwise direction. However, this is merely exemplary, and the position of the LED that starts to be turned on can be variously changed.

Further, as illustrated in FIG. 4B, according to another exemplary embodiment of the present disclosure, a multi-point light interaction may be provided, in which a plurality of LEDs #1 to #32 are sequentially turned on/off in multiple directions. Thus, a plurality of lights move corresponding to the multiple directions. FIG. 4B illustrates that the LEDs #5 and #6 that are positioned in a center upper region start to be turned on and the LEDs are sequentially turned on in both a clockwise direction and a counterclockwise direction. However, this is merely exemplary, and the positions of the LEDs that start to be turned on can be variously changed.

FIGS. 5A to 5C are diagrams illustrating an example of a status display according to another embodiment of the present disclosure.

Referring to FIG. 5A, the display device 100 may be implemented so that interaction information that corresponds to the UI screen is projected on a rear upper projection region (e.g., part of a wall surface) of the display device 100. In this case, a projector 40 may be arranged on an inside or outside of the rear side of the uppermost end of the display device 100 so that an image is projected on a corresponding projection region 50.

Referring to FIG. 5B, the display device 100 may be implemented so that interaction information that corresponds to the UI screen is projected on left and right projection regions (e.g., part of wall surfaces) of the display device 100. In this case, a plurality of projectors 41 and 42 may be provided and arranged on an inside or outside of the left and right sides of the display device 100 so that an image is projected on corresponding projection regions 51 and 52.

Referring to FIG. 5C, the display device 100 may be implemented so that an image is projected on a support (e.g., part of a glass support) on the lower side of the display device 100. In this case, a projector 40 may be positioned on the lower side of a front portion of the support so that an image is projected on a corresponding projection region 50.

In another embodiment illustrated in FIGS. 5A to 5C, the projector for projecting an image of interaction information on the projection region is positioned in a specific region. However, this is merely exemplary, and the projector is not necessarily arranged on the above-described region to project the image on the specific projection region.

Further, the projector is not necessarily arranged on the edge region of the display device 100. As illustrated in FIG. 5B, the projector may be arranged on the inside that is apart from the edge region for a preset distance. In FIG. 5B, if a projected image on the screen of the display device 100 is continuously displayed, the projectors 41 and 42 may be arranged in appropriate positions in consideration of the projection position.

FIGS. 6A to 6D are diagrams illustrating a display pattern according to an embodiment of the present disclosure.

Figure 6A:
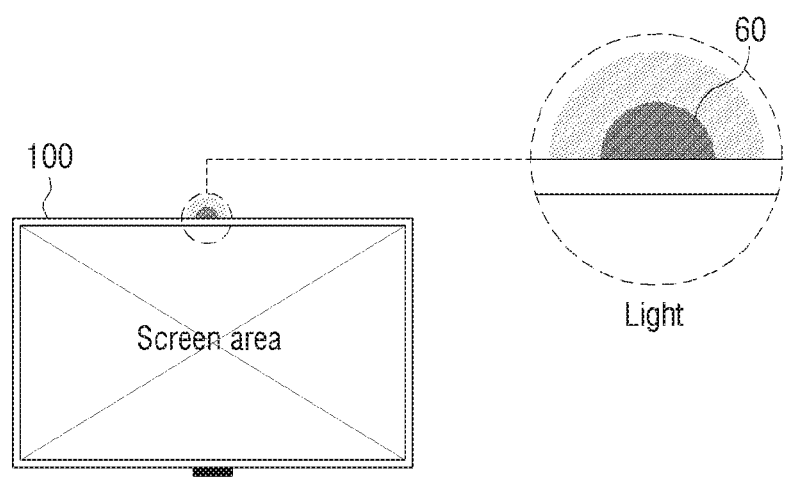
FIGS. 6A to 6D are diagrams illustrating a display pattern according to an exemplary embodiment of the present disclosure.

As illustrated in FIG. 6A, a point type light that is provided according to a light interaction according to the present disclosure may move along the outline of the display device 100. A plurality of LEDs may be arranged in positions in which the light interaction can be recognized in front of the display device 100, such as a front portion, an upper portion, and a rear portion of a bezel region of the display device 100, and may be arranged in appropriate positions depending on the strength of the light interaction. For example, if the plurality of LEDs are positioned on the front portion of the bezel region, a light interaction having somewhat high strength may be provided. In contrast, if the plurality of LEDs are positioned on the upper portion, a light interaction having somewhat low strength may be provided.

Figure 6B:
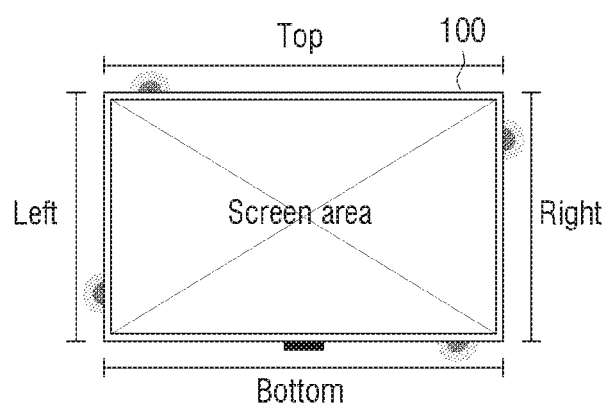

As illustrated in FIG. 6B, light interactions may be implemented so that lights move in at least one of upper, lower, left, and right outline regions of the screen. For example, the light interactions may be implemented so that the lights move only in the upper and lower outline regions of the screen, or move only in the left and right outline regions of the screen.

Figure 6C:
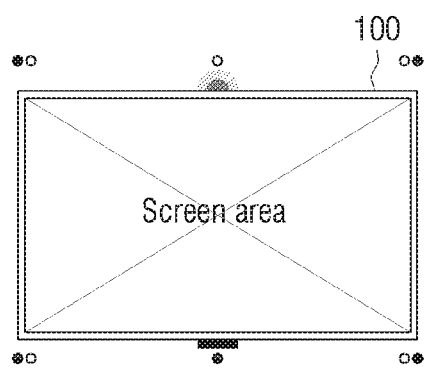

As illustrated in FIG. 6C, a starting point where a light is displayed and an end point where light disappears may be implemented in various positions. For example, a light may move from a starting point that is in the lower center region of the screen to an end point that is in the upper center region of the screen.

Figure 6D:
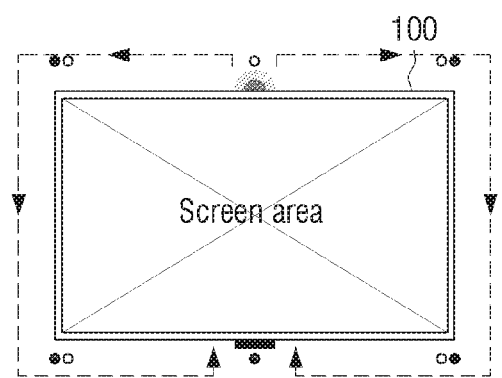

As illustrated in FIG. 6D, a light may be implemented so that the position of the light moves according to the interaction provided in the screen region. For example, with respect to a specific interaction, the light may be implemented so that the light starts to be displayed in the lower center region of the screen and disappears in the upper center region of the screen.

FIGS. 7A to 7F are diagrams illustrating display patterns of a one-point light interaction according to an embodiment of the present disclosure.

As illustrated in FIGS. 7A to 7D, a one-point light interaction, which is an interaction in which one light moves, may have a display pattern in which a light 60 moves in only one of four sides of the screen.

Figure 7A:
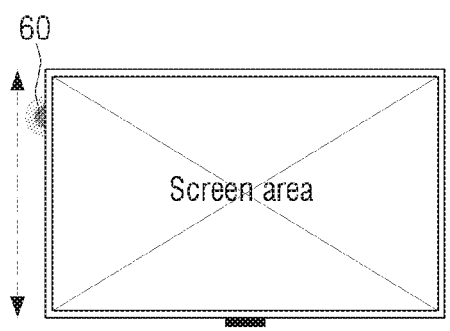
FIGS. 7A to 7F are diagrams illustrating display patterns of a one-point light interaction according to an exemplary embodiment of the present disclosure.

For example, as illustrated in FIG. 7A, the one-point light interaction may have a display pattern in which the light 60 moves in the left side among four sides of the screen.

Figure 7B:
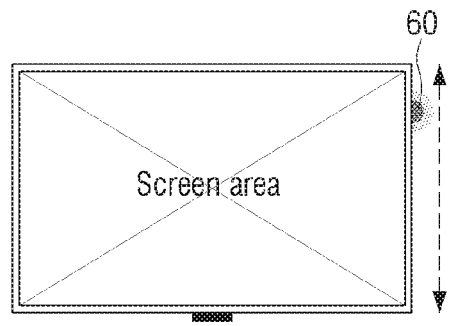

Further, as illustrated in FIG. 7B, the one-point light interaction may have a display pattern in which the light 60 moves in the right side among four sides of the screen.

Figure 7C:
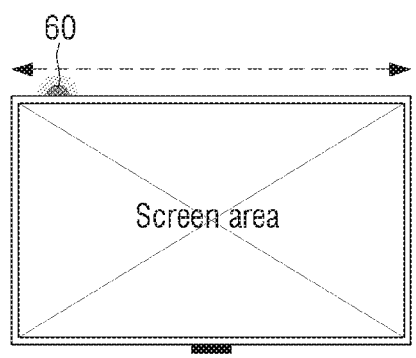

Further, as illustrated in FIG. 7C, the one-point light interaction may have a display pattern in which the light 60 moves in the upper side among four sides of the screen.

Figure 7D:
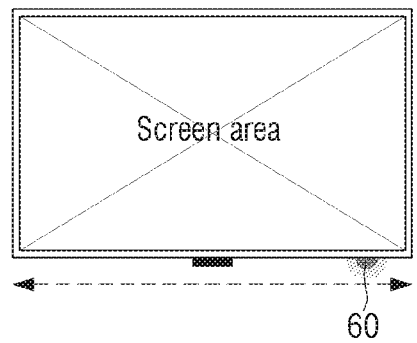

Further, as illustrated in FIG. 7D, the one-point light interaction may have a display pattern in which the light 60 moves in the lower side among four sides of the screen.

Figure 7E:
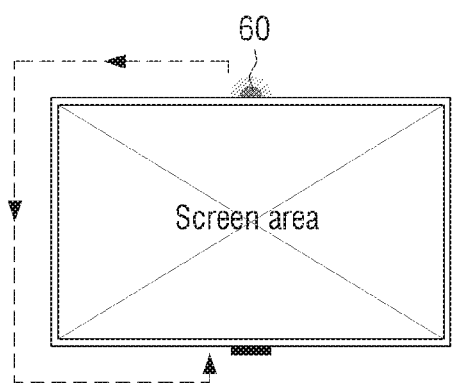
Figure 7F:
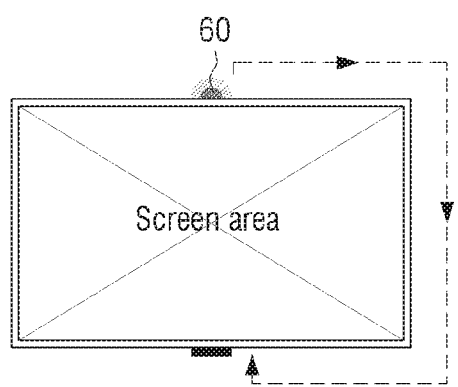

Further, as illustrated in FIGS. 7E and 7F, the one-point light interaction may have a display pattern in which the light 60 continuously moves through at least two sides among four sides of the screen.

For example, as illustrated in FIG. 7E, the one-point light interaction may have a display pattern in which the light 60 that starts to be turned on in the center of the upper side continuously moves in a counterclockwise direction and is turned on/off in the center of the lower side.

Further, as illustrated in FIG. 7F, the one-point light interaction may have a display pattern in which the light 60 that starts to be turned on in the center of the upper side continuously moves in a clockwise direction and is turned on/off in the center of the lower side.

Although not illustrated in the drawings, the one-point light interaction may have a display pattern that is opposite to the display pattern as illustrated in FIGS. 7E and 7F. That is, the one-point light interaction may have a display pattern in which the light starts to be turned on in the center of the lower side and is turned on/off in the center of the upper side.

FIGS. 8A to 8F are diagrams explaining examples to which the one-point light interaction according to an embodiment of the present disclosure is applied.

Figure 8A:
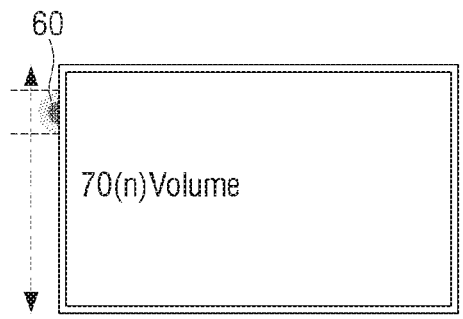
FIGS. 8A to 8F are diagrams illustrating examples to which the one-point light interaction according to an exemplary embodiment of the present disclosure is applied.
Figure 8B:
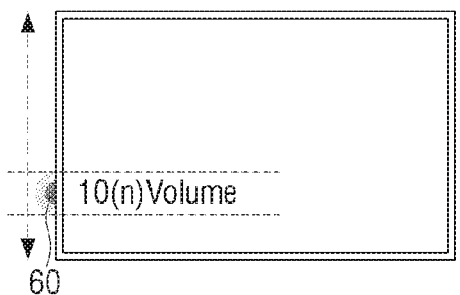

FIGS. 8A and 8B are diagrams illustrating a case where if a UI screen for volume control is provided, a one-point light interaction is provided in association with an interaction that occurs on the corresponding UI screen.

As illustrated in FIGS. 8A and 8B, the light interaction may have a display pattern in which a light 60 is displayed at a side in the same direction as the direction in which volume information is displayed.

In this case, as illustrated in FIG. 8A, the light 60 may be displayed with a relative coordinate value at the right side of the screen on which volume information is displayed. That is, if a vertical length of the screen corresponds to the entire volume value as illustrated, the light 60 may be displayed in the relative position that corresponds to the currently displayed volume value among the entire volume value.

Further, as illustrated in FIG. 8B, if the volume information is implemented to be displayed in a relative position according to the selected volume value, the light interaction may be implemented so that the light continuously moves according to the display position of the volume information. That is, the light 60 may be displayed to continuously move as the display position of the volume information moves at the right side of the screen on which the volume information is displayed.

Figure 8C:
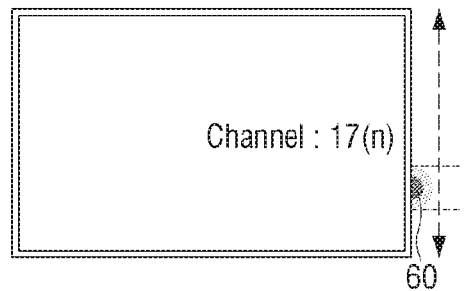
Figure 8D:
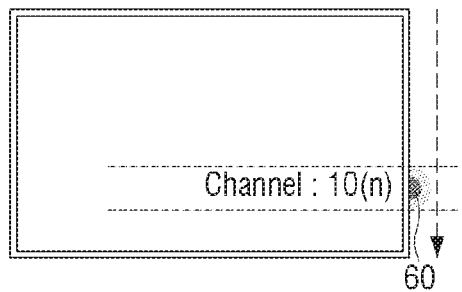

FIGS. 8C and 8D are diagrams illustrating a case where if a UI screen for channel control is provided, a one-point light interaction is provided in association with the corresponding UI screen.

As illustrated in FIGS. 8C and 8D, the light interaction may have a display pattern in which the light 60 is displayed at a side in the same direction as the direction in which channel information is displayed.

In this case, as illustrated in FIG. 8C, the light 60 may be displayed with a relative coordinate value at the left side of the screen on which channel information is displayed. That is, if a vertical length of the screen corresponds to the entire channel information, the light 60 may be displayed in the relative position that corresponds to the currently displayed channel information among the entire channel information.

Further, as illustrated in FIG. 8D, if the channel information is implemented to be displayed in a relative position according to the selected channel value, the light interaction may be implemented so that the light 60 continuously moves according to the display position of the channel information. That is, the light 60 may be displayed to continuously move as the display position of the channel information moves at the right side of the screen on which the channel information is displayed.

In the embodiment illustrated in FIGS. 8A to 8D, it is described that in the case of the volume information, the light is displayed in the left region of the screen. However, in the case of the channel information, the light is displayed in the right region of the screen. However, this is merely exemplary, and the display position of the information may be changed depending on a product model or user setting. Further, the display position of the information may be changed depending on the characteristics of the currently displayed image. For example, if an image has a blank space on the upper side of the screen, the corresponding information may be displayed on the upper region of the screen and the light interaction may be provided in the upper side portion.

Figure 8E:
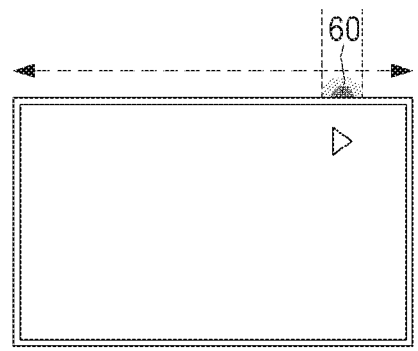

FIG. 8E is a diagram illustrating a case where if a UI screen that includes a progress bar is provided, a one-point light interaction is provided in association with the corresponding UI screen.

As illustrated in FIG. 8E, the light interaction may be provided, in which the display position of the light 60 moves according to the position of the progress bar that indicates a reproduction status of content that is currently reproduced/executed, i.e., the reproduction amount.

Figure 8F:
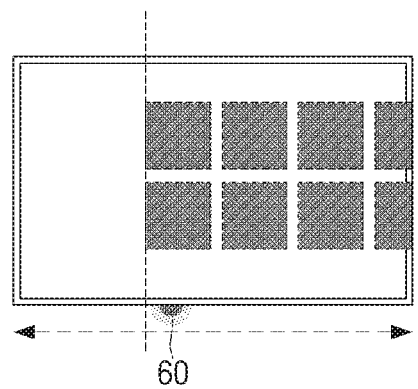

FIG. 8F is a diagram illustrating a case where if a UI screen in which panel (or page) movement (or shift) is performed, a one-point light interaction is provided in association with the corresponding UI screen.

As illustrated in FIG. 8F, if a panel movement is performed according to a user command, a light interaction in which the display position of the light 60 moves according to the position of the moving panel. For example, a light interaction may be provided, in which the light is displayed in the same position as the display position of the moving panel UI.

In the embodiment illustrated in FIGS. 8E and 8F, it is described that in the case of the progressive bar, the light interaction is provided at the upper side of the screen. However, in the case of the panel movement, the light interaction is provided at the lower side of the screen. However, this is merely exemplary, and the display position of the information may be changed depending on a product model or user setting.

FIGS. 9A to 9E are diagrams illustrating display patterns of a multi-point light interaction according to an embodiment of the present disclosure.

As illustrated in FIGS. 9A to 9D, a multi-point light interaction, which is an interaction in which at least two lights 61 and 62 move, may have a display pattern in which at least two lights move in at least two of four sides of the screen.

Figure 9A:
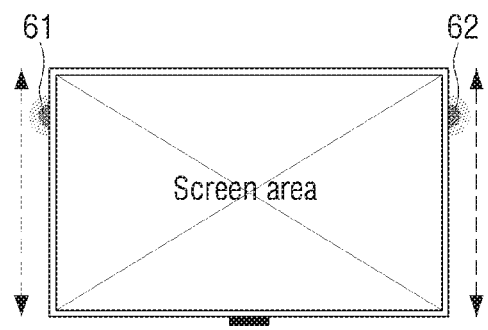
FIGS. 9A to 9E are diagrams illustrating display patterns of a multi-point light interaction according to an exemplary embodiment of the present disclosure.

For example, as illustrated in FIG. 9A, the multi-point light interaction may have a display pattern in which two lights 61 and 62 move in the same direction in the right and left sides among the four sides of the screen.

Figure 9B:
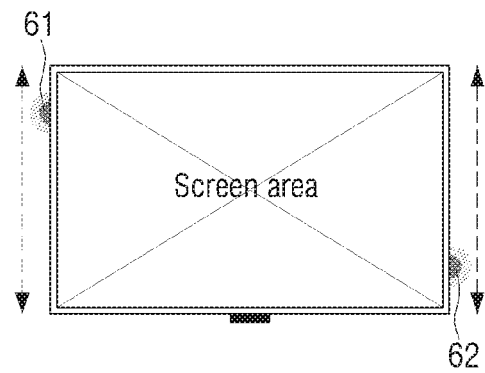

Further, as illustrated in FIG. 9B, the multi-point light interaction may have a display pattern in which two lights 61 and 62 move in different directions in the right and left sides among the four sides of the screen.

Figure 9C:
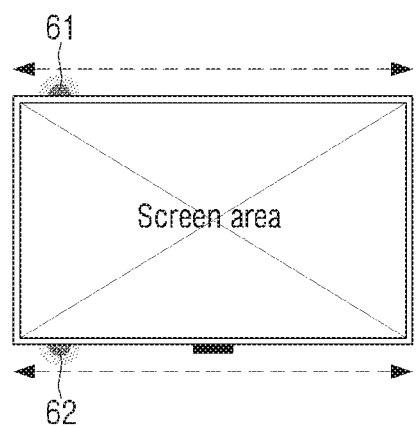

Further, as illustrated in FIG. 9C, the multi-point light interaction may have a display pattern in which two lights 61 and 62 move in the same direction in the upper and lower sides among the four sides of the screen.

Figure 9D:
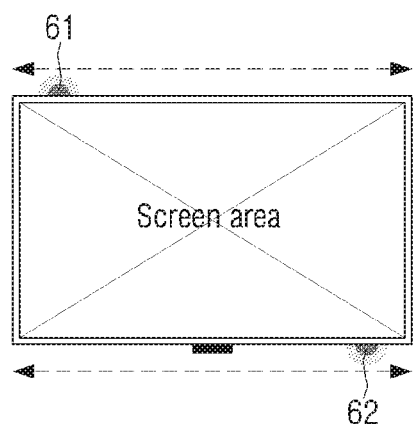

Further, as illustrated in FIG. 9D, the multi-point light interaction may have a display pattern in which two lights 61 and 62 move in different directions in the upper and lower sides among the four sides of the screen.

Figure 9E:
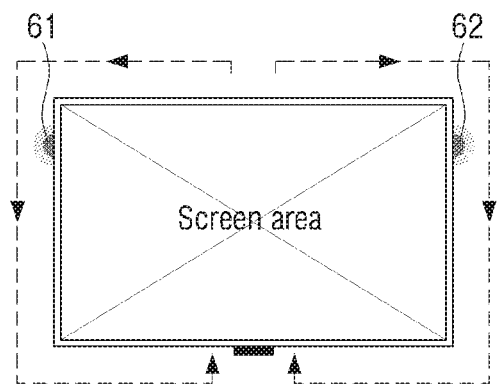

Further, as illustrated in FIG. 9E, the multi-point light interaction may have a display pattern in which at least two lights 61 and 62 simultaneously move in different directions in one of the four sides of the screen through at least two sides.

For example, as illustrated in FIG. 9E, the multi-point light interaction may have a display pattern in which the two lights 61 and 62 that start to be turned on in the center of the upper side continuously move in clockwise and counterclockwise directions, respectively, and are turned on/off in the center of the lower side.

Figure 10A:
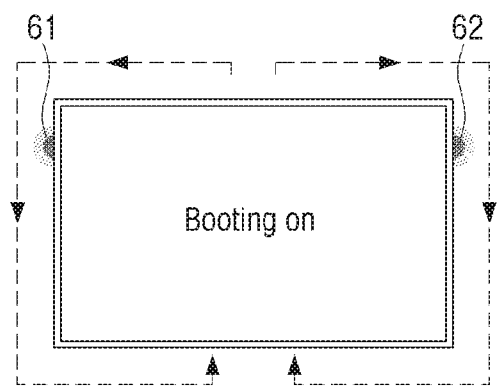
FIGS. 10A to 10C are diagrams illustrating examples to which the multi-point light interaction according to an exemplary embodiment of the present disclosure is applied.
Figure 10B:
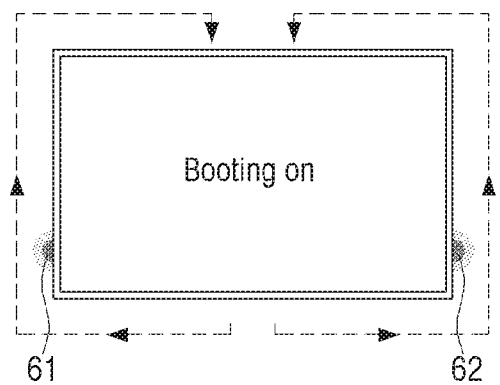
Figure 10C:
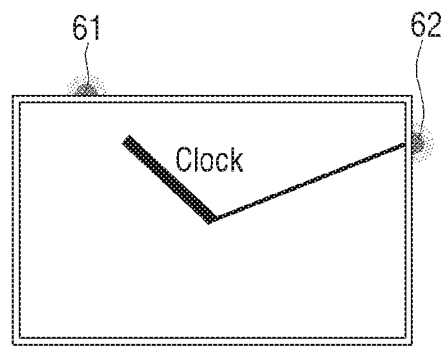

FIGS. 10A to 10C are diagrams illustrating examples to which the multi-point light interaction according to an embodiment of the present disclosure is applied FIGS. 10A and 10B are diagrams illustrating display patterns of light interactions if a booting-related screen is provided.

As illustrated in FIG. 10A, if a booting-on screen is displayed, the two lights 61 and 62 that start to be turned on in the center of the upper side of the screen continuously move in the clockwise and counterclockwise directions, respectively, and are turned on/off in the center of the lower side of the screen.

As illustrated in FIG. 10B, if a booting-off screen is displayed, the two lights 61 and 62 that start to be turned on in the center of the lower side of the screen continuously move in the clockwise and counterclockwise directions, respectively, and are turned on/off in the center of the upper side of the screen.

However, FIGS. 10A and 10B are merely exemplary. According to another embodiment, the light interactions for the booting-on screen and the booting-off screen may be provided in an opposite direction to the direction of the light interactions illustrated in FIGS. 10A and 10B.

As illustrated in FIG. 10C, if a clock screen is displayed, a light interaction may be provided, in which the two lights 61 and 62 are displayed in a side position that coincides with ends of the hour hand and the minute hand.

FIGS. 11A to 11F are diagrams explaining a method for providing a light interaction according to another embodiment of the present disclosure.

As illustrated in FIGS. 11A to 11E, corresponding information, e.g., guide information, may be displayed through beams by a projector 40 according to an interaction that occurs on the screen.

Figure 11A:
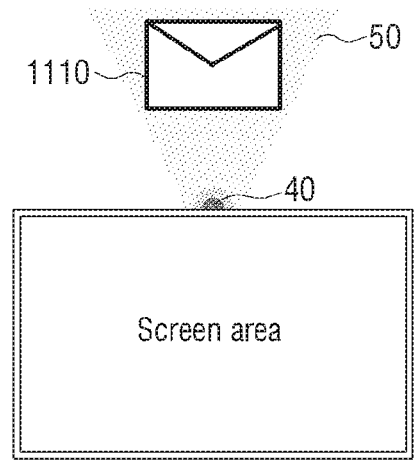
FIGS. 11A to 11F are diagrams illustrating a method for providing a light interaction according to another exemplary embodiment of the present disclosure.

As illustrated in FIG. 11A, if an event that a mail is received occurs, a mail icon 1110 may be displayed using the beams. As an example, the corresponding information may be provided on the projection region 50 of the screen by the beams projected by the projector 40 that is arranged in the upper side of the screen. However, the position in which the information is provided is not limited thereto.

Figure 11B:
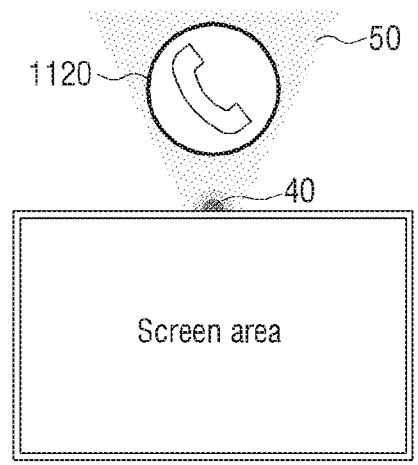

Further, as illustrated in FIG. 11B, if an event that a phone call is received occurs, a phone icon 1120 may be displayed through the beams.

Figure 11C:
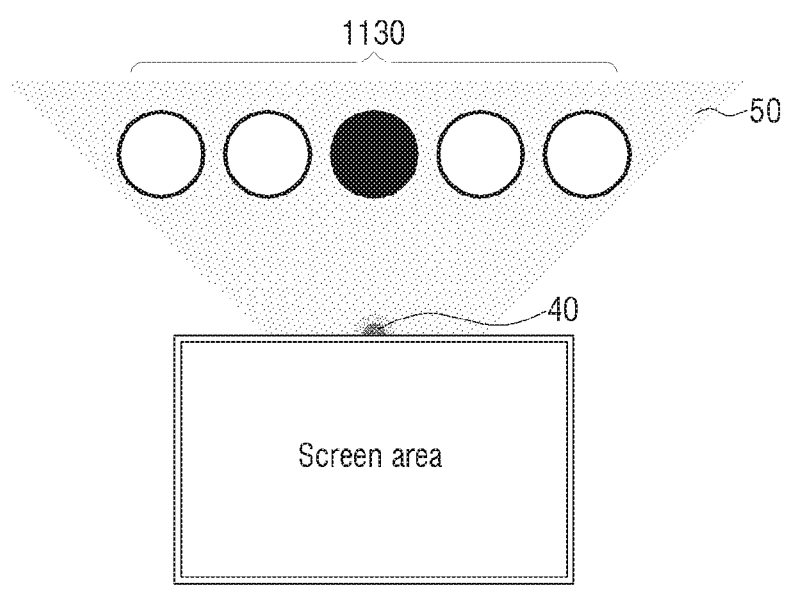

Further, as illustrated in FIG. 11C, a menu icon 1130 that is currently selected on the screen may be displayed through the beams. Although not illustrated in the drawing, according to another embodiment, if an event occurs in the selected menu, the icon may be displayed with its status changed. For example, event occurrence may be notified through changing the color of light or the strength of light.

Figure 11D:
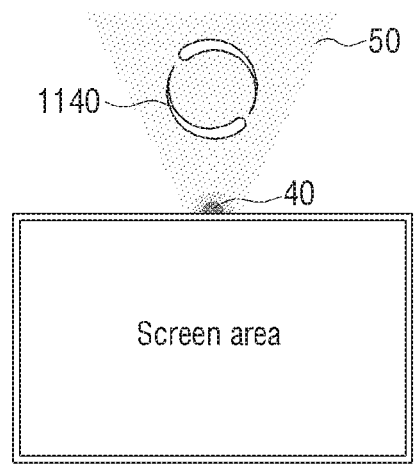

Further, as illustrated in FIG. 11D, if a screen is loaded, graphics 1140 that indicates the loading state may be displayed through the beams.

Figure 11E:
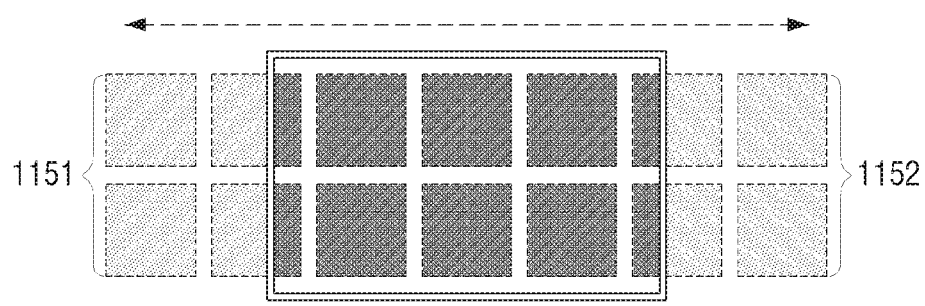

Further, as illustrated in FIG. 11E, if a page movement occurs on the screen, movement of unseen pages 1151 and 1152 may be displayed through the beams in the left and right sides of the screen.

Figure 11F:
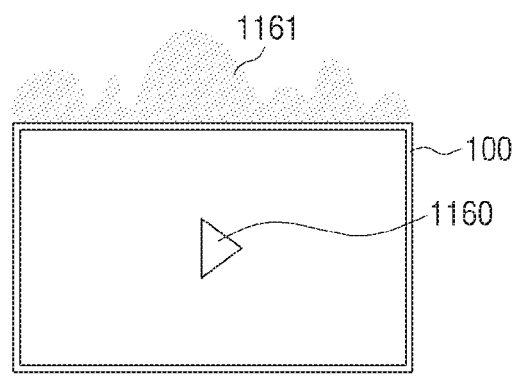

Further, as illustrated in FIG. 11F, if content is reproduced on the screen, an equalizer 1161 for the current sound source may be displayed through the beams.

FIG. 12 is a flowchart explaining a method for controlling a display device according to an embodiment of the present disclosure.

As illustrated in FIG. 12, according to a method for controlling a display device including a plurality of light emitting elements arranged in an outline region of a UI screen, a UI screen is first displayed (S1210).

Then, a light interaction in which the plurality of light emitting elements operate in a preset display pattern in association with an interaction that occurs on the UI screen is provided (S1220).

The method for controlling a display device may further include receiving an input of a user command for the UI screen. The providing the light interaction may control the light emitting status of the plurality of light emitting elements so as to provide feedback for the interaction that occurs on the UI screen according to the user command.

Further, the providing the light interaction may control the light emitting status of the plurality of light emitting elements so as to provide feedback for the interaction that occurs on the UI screen according to a preset event occurring in the display device.

Further, the providing the light interaction may control the light emitting status of the plurality of light emitting elements so that the plurality of light emitting elements operate in different display patterns according to the interaction that occurs on the UI screen.

Further, the providing the light interaction may control the light emitting status of the plurality of light emitting elements so that at least one light that moves according to a turn-on/off status of the plurality of light emitting elements moves to correspond to a preset object of which the position moves according to the interaction that occurs on the UI screen.

Further, the providing the light interaction may control the light emitting status of the plurality of light emitting elements so that the plurality of light emitting elements operate in one of a display pattern in which the plurality of light emitting elements are sequentially turned on/off and one light moves in one direction and a display pattern in which the plurality of light emitting elements are sequentially turned on/off and at least two lights move simultaneously in different regions according to the interaction that occurs on the UI screen.

The method for controlling a status display may further include projecting interaction information in association with the UI screen on a preset external region of the display device using a beam projector.

Here, the UI screen may include at least one of a channel control screen, a volume control screen, a booting screen, a content reproduction screen, a loading screen, a mail reception screen, a phone reception screen, a panel movement screen, a home screen, and a screen including a progress bar.

On the other hand, the light interaction according to an embodiment of the present disclosure may be implemented to be set or changed through a menu provided in the display device 100.

Further, the light interaction according to an embodiment of the present disclosure may be implemented to be performed by an application which is software that a user directly uses on the operating system (OS). Further, the application may be provided in an icon interface form on the screen of the display device 100.

As described above, according to the present disclosure, the interactions, which may be provided on the insufficient internal region of the screen, are provided through the light of the outline region of the screen. Thus, the interaction effects can be maximized. Accordingly, strong feedback effects can be provided to a user.

On the other hand, the method for controlling the display device according to the various embodiments as described above may be implemented by a computer-executable program code, and may be provided to respective servers or devices so that the method can be executed by a processor in a state where the method is stored in a non-transitory computer readable medium.

As an example, a non-transitory computer readable medium may be provided, in which a program for executing the configuration that provides a light interaction, in which the plurality of light emitting elements operate in the preset display pattern in association with the interaction that occurs on the UI screen, is stored.

The non-transitory computer readable medium is not a medium that stores data for a short period, such as a register, a cache, or a memory, but means a medium which semi-permanently stores data and is readable by a device. Specifically, various applications and programs as described above may be stored and provided in the non-transitory computer readable medium, such as, a CD, a DVD, a hard disc, a Blu-ray disc, a USB, a memory card, and a ROM.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A display device comprising:
    a display screen configured to display a user interface (UI) screen;
    a status display which comprises a plurality of light emitting elements arranged on an outline region of the display screen; and
    a controller configured to control a light emitting status of the plurality of light emitting elements so as to provide a light interaction in which the plurality of light emitting elements operate in a preset display pattern based on an interaction occurring on the UI screen,
    wherein the controller is further configured to control the light emitting status of the plurality of light emitting elements so that the plurality of light emitting elements operate in one display pattern of (i) a first display pattern in which the plurality of light emitting elements are sequentially turned on and turned off such that emitted light moves in one direction, and (ii) a second display pattern in which the plurality of light emitting elements are sequentially turned on and off such that emitted light in different areas, within the outline region of the display screen, from each other simultaneously moves based on the interaction occurring on the UI screen, and wherein the light interaction corresponds to the interaction occurring on the UI screen.

2. The display device as claimed in claim 1, further comprising:

a user interface configured to receive an inputted user command for controlling the UI screen, wherein the controller is further configured to control the light emitting status of the plurality of light emitting elements so as to provide a plurality of feedback for the interaction occurring on the UI screen according to the user command.

3. The display device as claimed in claim 1, wherein the controller is further configured to control the light emitting status of the plurality of light emitting elements so as to provide a plurality of feedback for the interaction occurring on the UI screen according to a preset event occurring in the display device.

4. The display device as claimed in claim 1, wherein the controller is further configured to control the light emitting status of the plurality of light emitting elements so that the plurality of light emitting elements operate in a plurality of different display patterns based on the interaction occurring on the UI screen.

5. The display device as claimed in claim 1, wherein the controller is further configured to control the light emitting status of the plurality of light emitting elements so that at least one light emitting element in "turn on" status of the plurality of light emitting elements turns off, and at least one light emitting element in "turn off" status of the plurality of light emitting elements turns on, such that emitted light moves to correspond to a moved position of a preset object, displayed on the UI screen, based on the interaction occurring on the UI screen, wherein the emitted light moves according to "turn on" and "turn off" status of the plurality of light emitting elements.

6. The display device as claimed in claim 1, wherein the status display further comprises a beam projector arranged on at least one portion of the outline region of the display screen.

7. The display device as claimed in claim 6, wherein the controller is further configured to control an operation of the beam projector so that interaction information, which is based on the interaction occurring on the UI screen, is projected on a preset external region that is separate from the display device.

8. The display device as claimed in claim 1, wherein the UI screen comprises at least one of a channel control screen, a volume control screen, a booting screen, a content reproduction screen, a loading screen, a mail reception screen, a phone reception screen, a panel movement screen, a home screen, and a screen which comprises a progress bar.

9. A method for controlling a display device including a plurality of light emitting elements arranged on an outline region of a user interface (UI) screen, the method comprising:

displaying the UI screen; and providing a light interaction in which the plurality of light emitting elements operate in a preset display pattern based on an interaction occurring on the UI screen, wherein the providing the light interaction comprises controlling a light emitting status of the plurality of light emitting elements so that the plurality of light emitting elements operate in one display pattern of (i) a first display pattern in which the plurality of light emitting elements are sequentially turned on and turned off such that emitted light moves in one direction, and (ii) a second display pattern in which the plurality of light emitting elements are sequentially turned on and off such that emitted light in different areas, within the outline region of the UI screen, from each other simultaneously moves based on the interaction occurring on the UI screen, and wherein the light interaction corresponds to the interaction occurring on the UI screen.

10. The method for controlling a display device as claimed in claim 9, further comprising:

receiving an inputted user command for the UI screen, wherein the providing the light interaction controls the light emitting status of the plurality of light emitting elements so as to provide a plurality of feedback for the interaction occurring on the UI screen according to the user command.

11. The method for controlling a display device as claimed in claim 9, wherein the providing the light interaction controls the light emitting status of the plurality of light emitting elements so as to provide a plurality of feedback for the interaction occurring on the UI screen according to a preset event occurring in the display device.

12. The method for controlling a display device as claimed in claim 9, wherein the providing the light interaction controls the light emitting status of the plurality of light emitting elements so that the plurality of light emitting elements operate in a plurality of different display patterns based on the interaction occurring on the UI screen.

13. The method for controlling a display device as claimed in claim 9, wherein the providing the light interaction controls the light emitting status of the plurality of light emitting elements so that at least one light emitting element in "turn on" status of the plurality of light emitting elements turns off, and at least one light emitting element in "turn off" status of the plurality of light emitting elements turns on, such that emitted light moves to correspond to a moved position of a preset object, displayed on the UI screen, based on the interaction occurring on the UI screen, wherein the emitted light moves according to "turn on" and "turn off" status of the plurality of light emitting elements.

14. The method for controlling a status display as claimed in claim 9, further comprising projecting interaction information, which is based on the interaction occurring on the UI screen, on a preset external region that is separate from the display device using a beam projector.

15. The method for controlling a display device as claimed in claim 9, wherein the UI screen comprises at least one of a channel control screen, a volume control screen, a booting screen, a content reproduction screen, a loading screen, a mail reception screen, a phone reception screen, a panel movement screen, a home screen, and a screen which comprises a progress bar.

16. A system for controlling a light interaction comprising:

a user interface (UI) screen;

a plurality of light emitting elements arranged on an outer edge of the UI screen; and a controller configured to control a light emitting status of the light emitting elements so as to provide the light interaction in which the plurality of light emitting elements operate in a preset chase pattern based on an interaction occurring on the UI screen, wherein the controller is further configured to control the light emitting status of the plurality of light emitting elements so that the plurality of light emitting elements operate in one display pattern of (i) a first display pattern in which the plurality of light emitting elements are sequentially turned on and turned off such that emitted light moves in one direction, and (ii) a second display pattern in which the plurality of light emitting elements are sequentially turned on and off such that emitted light in different areas, within the outer edge of the UI screen, from each other simultaneously moves based on the interaction occurring on the UI screen, and wherein the light interaction corresponds to the interaction occurring on the UI screen.

17. The system as claimed in claim 16, wherein the preset chase pattern comprises sequentially turning on and then off the light emitting elements to cause emitted light to move in a predetermined direction.

18. The system as claimed in claim 16, wherein the interaction occurring on the UI screen comprises at least one of changing a number of pieces of displayed content on the UI screen, changing a size of the displayed content on the UI screen, changing a proceeding time point of the displayed content on the UI screen, changing a volume of sound associated with the displayed content up or down on the UI screen, changing a channel that the UI screen is set to display up or down, displaying a received mail on the UI screen, and displaying a notification on the UI screen that a phone call is being received.

* * * * *